(12) United States Patent
Salvaro

(10) Patent No.: US 11,685,566 B2
(45) Date of Patent: Jun. 27, 2023

(54) APPARATUS FOR THE VACUUM PACKAGING OF FOOD

(71) Applicant: Marziano Salvaro, Negrar (IT)

(72) Inventor: Marziano Salvaro, Negrar (IT)

( * ) Notice: Subject to any disclaimer, the term of this patent is extended or adjusted under 35 U.S.C. 154(b) by 80 days.

(21) Appl. No.: 17/190,941

(22) Filed: Mar. 3, 2021

(65) Prior Publication Data

US 2021/0276750 A1    Sep. 9, 2021

(30) Foreign Application Priority Data

Mar. 4, 2020 (IT) .................. 102020000004519

(51) Int. Cl.
- B65B 31/04 (2006.01)
- F04B 53/08 (2006.01)
- F04B 53/20 (2006.01)

(52) U.S. Cl.
CPC ............ B65B 31/046 (2013.01); F04B 53/08 (2013.01); F04B 53/20 (2013.01); *F04B 2201/0801* (2013.01)

(58) Field of Classification Search
CPC ........ B65B 31/046; F04B 53/08; F04B 53/20; F04B 2201/0801
See application file for complete search history.

(56) References Cited

U.S. PATENT DOCUMENTS

| | | | | |
|---|---|---|---|---|
| 6,256,968 B1* | 7/2001 | Kristen | ................. | F04B 49/022 53/512 |
| 6,527,517 B1* | 3/2003 | Wallrafen | ............... | F04B 53/16 417/32 |
| 7,134,259 B2* | 11/2006 | Huang | .................. | B65B 31/046 53/512 |
| 2005/0050855 A1* | 3/2005 | Baptista | ................ | B65B 31/046 53/512 |
| 2007/0199283 A1* | 8/2007 | Sung | ..................... | B65B 31/046 53/512 |
| 2017/0107004 A1* | 4/2017 | Bocks | ....................... | C12H 1/00 |
| 2021/0033086 A1* | 2/2021 | Carrera | ................ | F04D 19/042 |

FOREIGN PATENT DOCUMENTS

| CN | 205025829 U | 2/2016 |
|---|---|---|
| DE | 3340340 A1 | 5/1985 |

OTHER PUBLICATIONS

IT Search Report dated Oct. 26, 2020 re: Application No. 102020000004519, pp. 1-13, citing: US 2007/0199283 A1, DE 33 40 340 A1 and CN 205 025 829 U.

* cited by examiner

*Primary Examiner* — Andrew M Tecco
*Assistant Examiner* — Nicholas E Igbokwe
(74) *Attorney, Agent, or Firm* — Cantor Colburn LLP

(57) ABSTRACT

An apparatus for the vacuum packaging of food, which includes a base structure which defines a vacuum chamber which can be connected to a vacuum pump. Between the vacuum chamber and the vacuum pump, at least one air filtration device is provided which has elements for varying at least one thermo-fluid dynamics parameter of the flow of air extracted from the vacuum chamber by the vacuum pump, in order to enable the elimination, from the air extracted from the vacuum chamber, of water, biochemical liquids and biological materials.

10 Claims, 5 Drawing Sheets

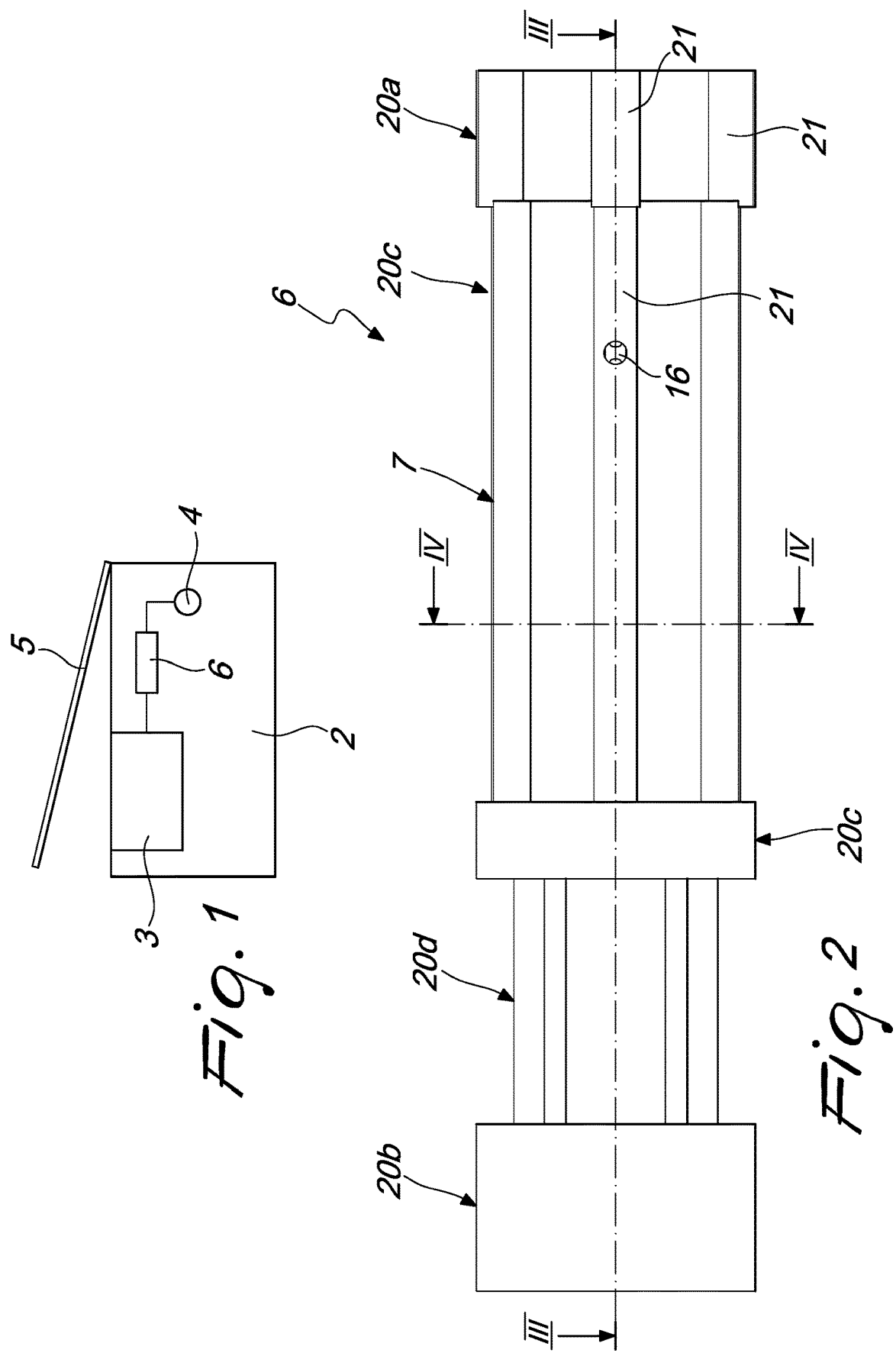

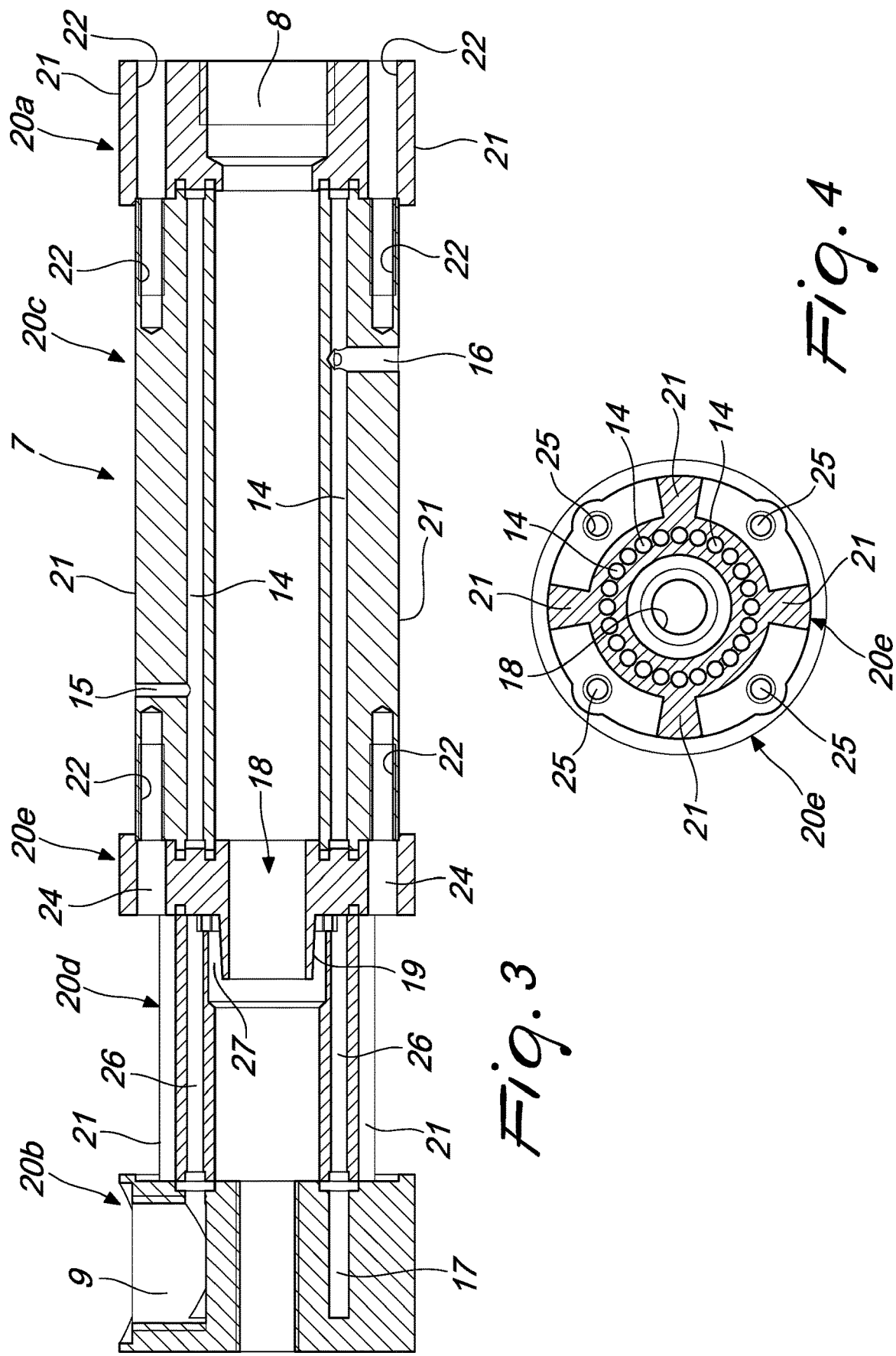

APPARATUS FOR THE VACUUM PACKAGING OF FOOD

CROSS REFERENCE TO RELATED APPLICATIONS

This application is related to and claims the benefit of Italian Patent Application No. 102020000004519, filed on Mar. 4, 2020, the contents of which are incorporated herein by reference in their entirety.

TECHNICAL FIELD

The present disclosure relates to an apparatus for the vacuum packaging of food.

BACKGROUND

As is known, apparatuses for the vacuum packaging of food, for the preservation or the cooking thereof, comprise a base structure which defines a vacuum chamber, normally constituted by a tub which can be closed hermetically by way of an upper lid, and inside which it is possible to place an adapted sealable packaging container, typically a bag made of suitable plastic material, in which the food to be packaged is placed.

The vacuum chamber is connected, by way of a channel system for circulating the air, to a vacuum pump.

In the vacuum chamber there are, furthermore, means for heat-sealing the packaging bag, which are activated once the air has been extracted from the bag via the vacuum pump.

The operation of these apparatuses is managed via numerous solenoid valves, sensors and actuators controlled by firmware resident in an electronic power board, which is generally also connected to an electronic user interface board which is provided with a display.

The food can be subjected to vacuum packaging both hot and cold, and the vacuum packaging process tends to extract a certain quantity of water from it, which carries biological material and biochemical liquids of various kinds.

The quantity of water, biochemical liquids and biological material extracted from foods during vacuum packaging by the vacuum pump is proportional to the quantity of humidity present on the surface of and inside the food and on its temperature, i.e., the hotter the food the greater the quantity of water that will be extracted and will be propagated in the form of mist.

For these reasons, during the short time for which the vacuum pump is connected to the vacuum chamber, together with the air and biochemical liquids, water is also extracted by the vacuum pump and brings biological material and dry particulate.

This inevitable effect of transfer means that water and biological material accumulate inside the vacuum pump.

The mixture of water and biological material that is formed builds up, without mixing, in the oil for lubrication and cooling of the vacuum pump.

The presence of non-lubricating substances that have a different heat transfer capacity alters the characteristics of the oil for lubrication and cooling, to the point where the physical characteristics of the oil deteriorate completely, in particular its viscosity, dielectric capacity and thermal conductivity.

In particular, the presence of water or biochemical liquid, which have a boiling point different from that of the oil for lubrication and cooling, alters the heat transfer coefficient of the oil for lubrication and cooling with negative effects on the reliability and the useful life of the vacuum pump.

SUMMARY

The aim of the present disclosure is to provide an apparatus for vacuum packaging that is capable of improving the known art in one or more of the above mentioned aspects.

Within this aim, the disclosure provides an apparatus for vacuum packaging that is capable of ensuring the mechanical durability over time of the vacuum pump and of its specific characteristics.

The disclosure also provides an apparatus for vacuum packaging that makes it possible to prevent the extraction, together with air, of a biologically polluted wet or dry component by the vacuum pump.

The disclosure further provides an apparatus for vacuum packaging that is capable of offering the widest guarantees of reliability and safety in operation.

The present disclosure overcomes the drawbacks of the background art in an alternative manner to any existing solutions.

The disclosure advantageously provides an apparatus for vacuum packaging that is relatively easy to implement and which can be made at low cost.

This aim and these and other advantages which will become better apparent hereinafter are achieved by providing an apparatus for vacuum packaging, according to claim 1, optionally provided with one or more of the characteristics of the dependent claims.

BRIEF DESCRIPTION OF THE DRAWINGS

Further characteristics and advantages of the disclosure will become better apparent from the detailed description that follows of a preferred, but not exclusive, embodiment of the apparatus for vacuum packaging according to the disclosure, which is illustrated for the purposes of non-limiting example in the accompanying drawings wherein:

FIG. 1 is a schematic view of the apparatus according to the disclosure;

FIG. 2 is a side view of a filtration device of the apparatus according to the disclosure;

FIG. 3 is a cross-sectional view taken along the line III-III in FIG. 2;

FIG. 4 is a cross-sectional view taken along the line IV-IV in FIG. 2;

DETAILED DESCRIPTION OF THE DRAWINGS

Figure 5:
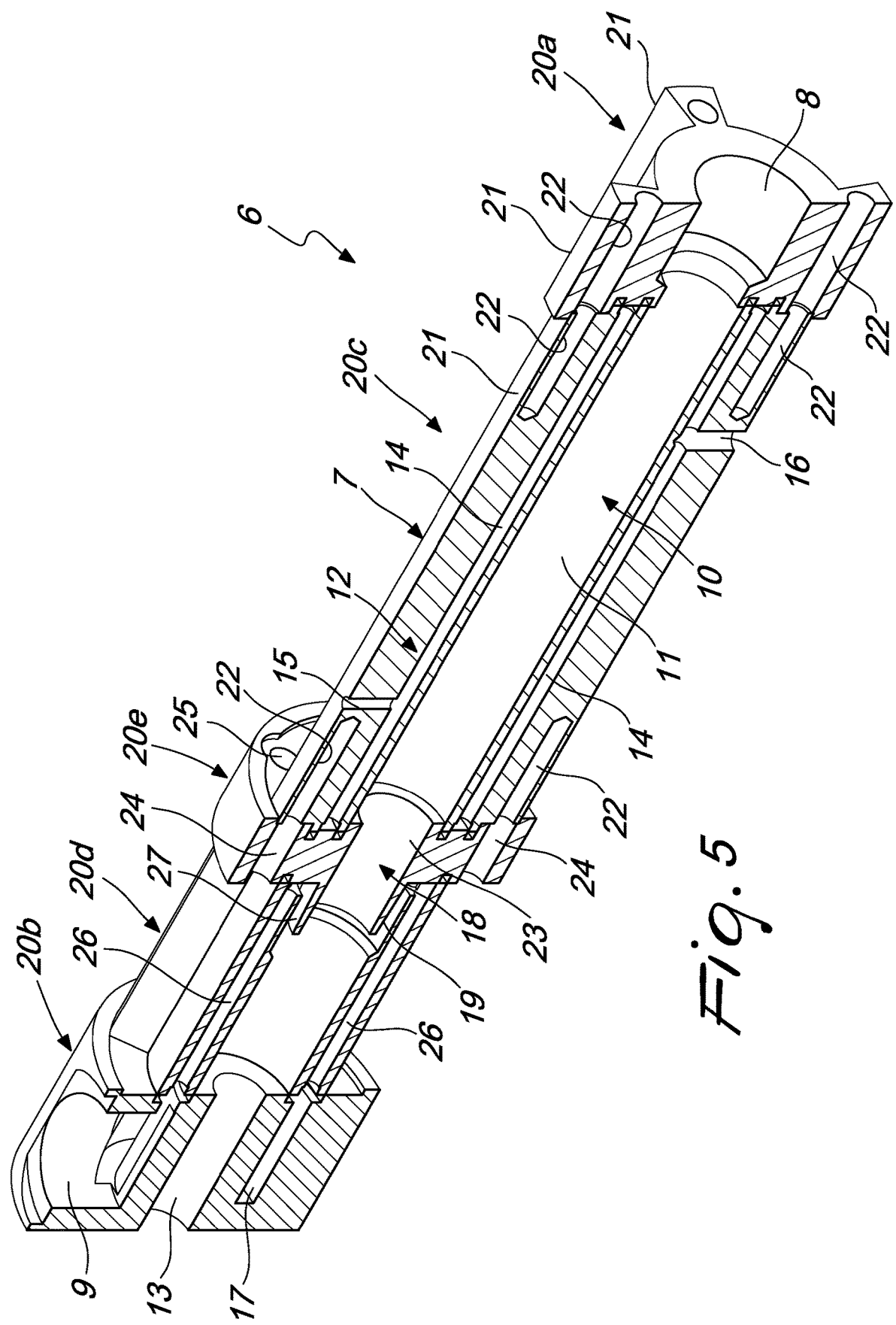
FIG. 5 is a longitudinal cross-sectional perspective view of the filtration device of the apparatus according to the disclosure.
Figure 6:
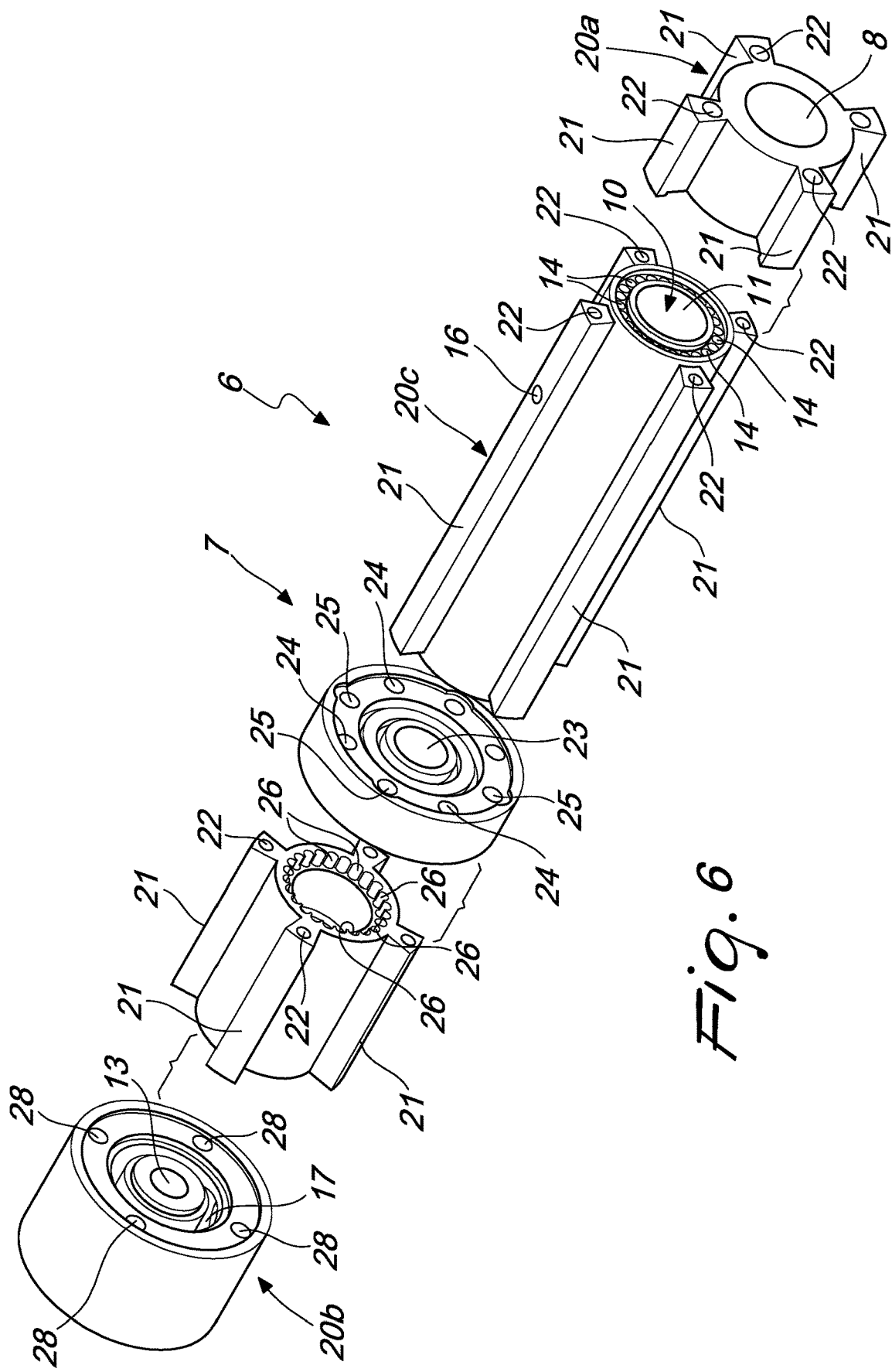
FIG. 6 is an exploded perspective view of the filtration device of the apparatus according to the disclosure.
Figure 7:
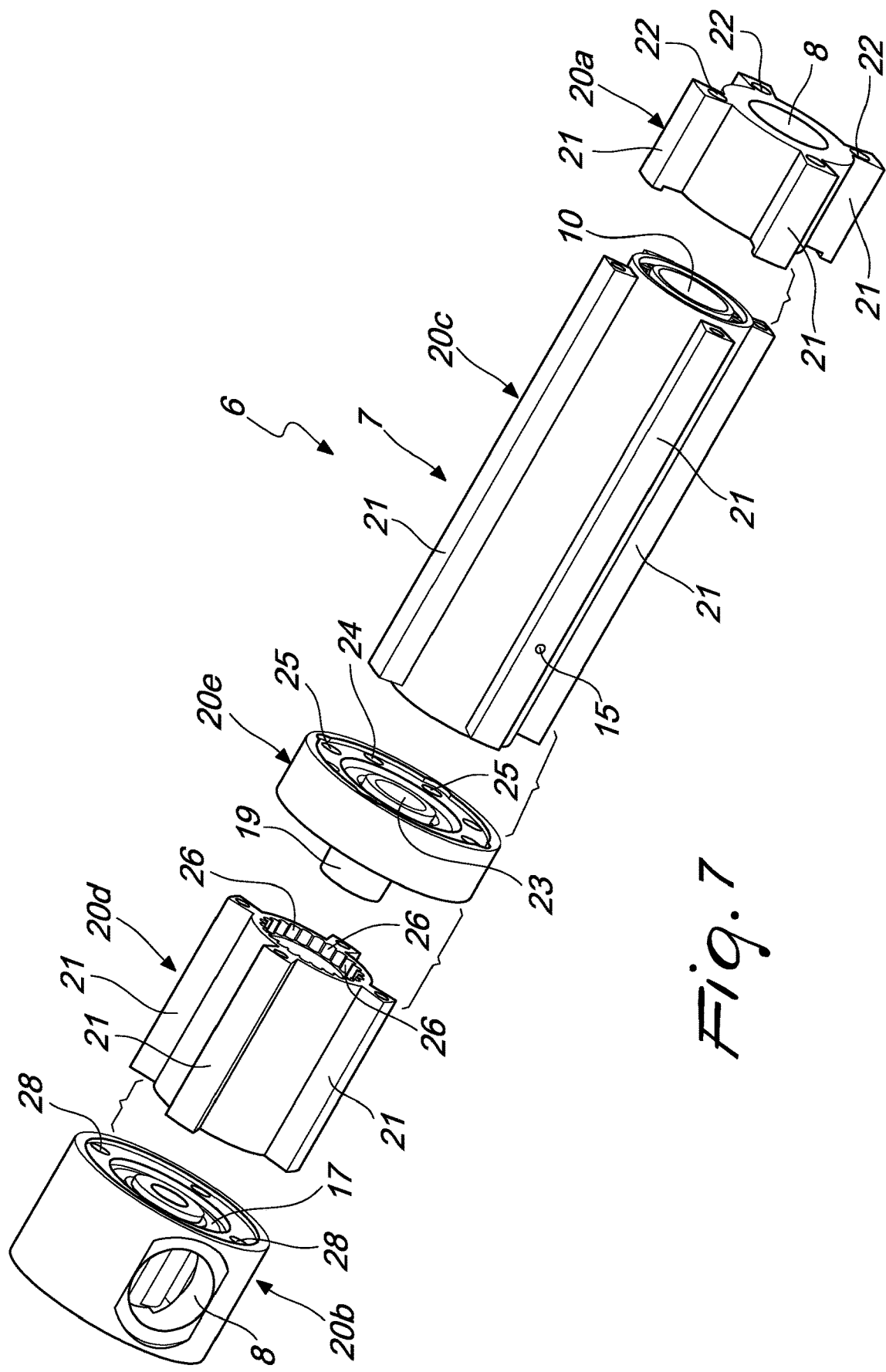
FIG. 7 is an exploded perspective view from a different angle of the filtration device of the apparatus according to the disclosure.

With reference to the figures, the apparatus for the vacuum packaging of food, according to the disclosure, generally designated by the reference numeral 1, comprises a base structure 2 which defines a vacuum chamber 3, which can be connected to a vacuum pump 4.

For example, as schematically illustrated in FIG. 1, the vacuum chamber 3 is provided by a tub which is open upward and which can be closed above with a lid 5, hinged to the base structure 2, inside which a container, not shown, can be placed, inside which the foods to be vacuum packaged are placed.

Between the vacuum chamber 3 and the vacuum pump 4, at least one air filtration device 6 is provided which has means for varying at least one thermo-fluid dynamics parameter of the flow of air extracted from the vacuum chamber 3 by the vacuum pump 4, in order to enable the elimination, from the air extracted from the vacuum chamber 3, of water, biochemical liquids, dry particulate and biological materials.

Conveniently, such filtration device 6 comprises an enclosure 7 which has at least one inlet 8 which communicates with the vacuum chamber 3 and at least one outlet 9 which, in turn, communicates with the vacuum pump 4.

In particular, the above mentioned means for varying at least one thermo-fluid dynamics parameter are, conveniently, interposed along the path of the flow of air inside the enclosure 7 from the inlet 8 to the outlet 9.

Advantageously, such means for varying at least one thermo-fluid dynamics parameter comprise means for varying the temperature of the flow of air extracted from the vacuum chamber 3 which, conveniently, comprise means for cooling the flow of air, in order to allow the extraction of the water contained in air extracted from the vacuum chamber 3 via condensation.

Conveniently, the means for varying at least one thermo-fluid dynamics parameter can also comprise: means for varying the momentum of the quantity of motion of the flow of air extracted from the vacuum chamber 3, which make it possible to favor the separation of particles of greater mass from the flow of air; means for varying the pressure/speed of the flow of air extracted from the vacuum chamber, in order to facilitate the downward depositing of smaller particles; and also, optionally, means for varying the density, at a constant volume, of the air extracted from the vacuum chamber, which also make it possible to favor separation of the air extracted from the vacuum chamber from water and any particles of biological material, wet or dry, transferred together with the air.

In more detail, at least one air conveyance channel 10 is defined in the enclosure 7 and extends from the inlet 8 to the outlet 9.

Along the conveyance channel 10 at least one condensation chamber 11 is defined for condensing the water contained in the flow of air that passes through the conveyance channel 10.

In particular, the above mentioned cooling means comprise circulation means 12 of a cooling fluid, such as, for example, a coolant gas, which are in a heat exchange relationship with the condensation chamber 11 and which will be better described below.

Conveniently, at least one discharge port 13 of the water condensed and separated from the flow of air that passes through the conveyance channel 10 is defined in the enclosure 7.

Advantageously, the discharge port 13 can be connected to a dedicated collection tank, not shown, which is connected to vacuum generation means that can be activated on command to recover the water through the discharge port 13 in the collection tank.

As illustrated, the enclosure 7 is advantageously provided with an axial extension, with the inlet 8 defined axially at one of its ends, while the condensation chamber 11 extends along the axis of the enclosure 7, preferably immediately downstream of the inlet 8, along the direction of the flow of air in the conveyance channel 10.

The circulation means 12 of the cooling fluid are, conveniently, constituted by a plurality of heat exchange conduits 14 which are arranged in a heat exchange relationship with the side walls of the condensation chamber 11 and which extend substantially mutually parallel and substantially parallel to the axis of the condensation chamber 11. Such heat exchange conduits 14 communicate with an intake port 15 and an outlet port 16 of the cooling fluid, which are connected, conveniently, to a refrigerating assembly, not shown, which makes it possible to maintain the temperature of the cooling fluid at the desired value, sufficient to ensure the condensation of the water contained in the air extracted from the vacuum chamber 3.

Advantageously, the outlet 9 of the air is radially defined at the other end of the enclosure 7 and communicates with at least one connecting portion 17 of the conveyance channel 10 which is connected to the condensation chamber 11 and extends circumferentially around the axis of the enclosure 7, so that in the transit from the condensation chamber 11 to the connecting portion 17, the flow of air inside the conveyance channel 10 can undergo a change in its momentum of quantity of motion.

Advantageously, at least one portion 18 which increases the speed of the flow of air that passes through the conveyance duct 10 is, furthermore, defined in the conveyance duct 10 between the condensation chamber 11 and the outlet 9, and is, conveniently, provided by a nozzle 19 which has a smaller passage cross-section than the condensation chamber 11, so that, in the transit of the flow of air through the nozzle 19, the flow of air can undergo an increase of its speed and a reduction of pressure which favor the downward deposit by gravity of the smaller particles that remain in suspension in the air that flows through the conveyance duct 10.

Conveniently, in order to allow the possibility of rapidly raising the temperature of the conveyance channel 11 and, in particular, of the condensation chamber 11 after the intervention of the cooling means, thus allowing the rapid defrosting of the condensation chamber 11, there are heating means in a heat exchange relationship with the conveyance duct 10, which can be constituted, for example, by electric resistors, not shown, applied with adhesive to the enclosure 7, or by means for circulating a heating fluid.

As in the embodiment of the disclosure shown in the figures, the enclosure 7 can be provided by a plurality of component elements, which can be axially assembled together, conveniently using connectors of the flanged type or the like.

Thus, for example, there can be two end component elements, respectively a first end component element 20*a*, in which the inlet 8 is defined, and a second end component element 20*b*, in which the outlet 9 and the discharge port 13 are defined.

Between the two end component elements 20*a* and 20*b* there can be one or more longitudinal components which axially define respective portions of the conveyance channel 10 and, more specifically, according to the example shown, a first longitudinal component element 20*c* and a second longitudinal component element 20*d*, between which an intermediate component element 20*e* can be interposed.

In greater detail, the first end component element 20*a* can be constituted by a substantially cylindrical body, axially passed through by a passage, which provides the inlet 8 of the enclosure 7, and fitted, laterally, with axial ribs 21, angularly mutually spaced apart, which define seats 22 for fixing screws, not shown, which make it possible to connect the first end component element 20a to one end of the first longitudinal component element 20c.

In turn, the first longitudinal component 20c is constituted by a tubular body which, with its inner axial cavity, defines the condensation chamber 11 and which also has axial ribs 21 externally, similar to those of the first end component 20a and defining corresponding seats 22 for the screws for fixing the first end component 20a to the first longitudinal component 20c.

In particular, in the thickness of the side wall of the tubular body that provides the first longitudinal component 20c, narrow channels are longitudinally defined which provide the heat exchange conduits 14 and which communicate externally through two radial holes which define, respectively, the intake port 15 and the outlet port 16 of the cooling fluid and which can, therefore, be connected to the refrigerating assembly.

The intermediate component element 20e is provided by a cylindrical body, axially passed through by a through opening 23, which has a smaller transverse cross-section than the inner axial cavity of the first longitudinal component element 20c, so as to provide the portion 18 of the conveyance channel 10.

In particular, the intermediate component element 20e abuts, with an axial face thereof, against the end of the first longitudinal element 20c arranged opposite from the end connected to the first end component element 20a, and is provided, peripherally, with a plurality of first through holes 24 for accommodating connecting screws, not shown, which can engage in respective seats 22 defined in the longitudinal ribs 21 of the tubular body of the first longitudinal component 20c.

At its opposite face, the intermediate component element 20e has, around the through opening 23, an axial extension, which defines the nozzle 19, and abuts against an end of the second longitudinal component element 20d, to which it can be fixed using connecting screws, not shown, which are inserted in second through holes 25, provided in its peripheral region.

The second longitudinal component 20d also has a tubular body which is provided laterally with axial ribs 21 which are located in a similar position to the second through holes 25 of the intermediate component element 20e and in which respective seats 22 are defined for the connecting screws inserted in the second through holes 25 of the intermediate component element 20e.

In the thickness of the wall of the second longitudinal component element 20d, a plurality of longitudinal channels 26 is axially defined which are connected, at their end directed toward the intermediate component element 20e, with the inner axial cavity of the tubular body of the second longitudinal component element 20d, and which are open, at the other end thereof, on the axial face of the tubular body of the second longitudinal component element 20d.

Conveniently, the inner axial cavity of the tubular body of the second longitudinal component element 20d has an enlargement at its end directed toward the intermediate component element 20e which receives, with play, the axial extension that defines the nozzle 19 in order to define an annular interspace 27 that connects the inner axial cavity of the tubular body of the second longitudinal component element 20d with the longitudinal channels 26.

The second end component element 20b is constituted by a cylindrical body, axially passed through by a passage hole which provides the discharge port 13 for the condensed water and which abuts with an axial face thereof against the end of the second longitudinal component element 20d opposite from the end directed toward the intermediate component element 20e.

On the face of the second end component element 20b a circular groove is defined, which is open toward the channels 26 of the second longitudinal component element 20d and which defines the connecting portion 17, while, on the side surface of the second end component element 20b, a radial opening is provided which is connected to the aforementioned circular groove and which defines the outlet 9.

In the peripheral region of the cylindrical body that provides the second end component element 20b there are through holes 28 for the engagement of screws, not shown, which are inserted in respective seats 22 which are defined in the axial ribs 21 of the second longitudinal component element 20d, in order to provide the connection of the second end component element 20b with the second longitudinal component element 20d.

The operation of the apparatus according to the disclosure is the following.

A container for vacuum packaging is placed inside the vacuum chamber 3 and the lid 5 is closed.

The apparatus is then put into operation to execute a work cycle, by way of activation of the vacuum pump 4, and at the same time the cooling means are activated which make it possible to maintain the inner surface of the condensation chamber 11 at a low temperature.

The air extracted by the vacuum pump 4 enters the filtration device 6 through the inlet 8 and flows in the conveyance channel 10 inside the filtration device 6.

On the walls of the conveyance channel 10 and, in particular, of the condensation chamber 11, the condensation of the humidity contained in the air extracted by the vacuum pump 4 occurs and, consequently, even the separation from the air of the particles of biological material carried with it.

The air successively passes through the nozzle 19 where it undergoes an increase in speed and a reduction in pressure which favor the downward deposit of any particles that have remained in suspension.

At this point, the flow of air passes through the interspace 27 and reaches the longitudinal channels 26, by way of which they reach the connecting portion 17 in order to then exit from the filtration device through the outlet 9.

In the transit through the interspace 27 and, subsequently, the connecting portion 17, the flow of air undergoes a change of the momentum of the quantity of motion, which favors the deposit of any residual particles that have remained in suspension, before the air exits from the filtration device 6 through the outlet 9.

Once the minimum pressure has been reached in the vacuum chamber 3 for the length of time necessary to complete the work cycle with extraction of the air from the container inserted in the vacuum chamber 3, the following steps take place in sequence: shutdown of the cooling means; shutdown of the vacuum pump 4 with consequent possibility of opening the lid 5 to retrieve the container with the vacuum-packaged foods placed inside it; activation of the heating means, with consequent defrosting of the conveyance channel 10; draining of the water and of the biological material deposited to the outside of the filtration device 6 via activation of the vacuum generation means in the collection container.

At this point, the cooling means are reactivated, so that the apparatus is ready for a new work cycle.

In practice it has been found that the disclosure fully achieves the intended aim and objects and, in particular, attention is drawn to the fact that the apparatus for vacuum packaging has been found to be positively capable of preventing the buildup of humidity and pollutant particles in the vacuum pump.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

What is claimed is:

1. An apparatus for the vacuum packaging of food, which comprises a base structure which defines a vacuum chamber which is configured to be connected to a vacuum pump, further comprising, between said vacuum chamber and said vacuum pump, at least one air filtration device which has variation means configured for varying at least one thermofluid dynamics parameter of a flow of air extracted from said vacuum chamber by said vacuum pump, to enable the elimination, from the air extracted from said vacuum chamber, of water, biochemical liquids, and biological materials, wherein said filtration device comprises an enclosure which has at least one inlet which communicates with said vacuum chamber and at least one outlet which communicates with said vacuum pump, said variation means being interposed along the path of the flow of air inside said enclosure from said inlet to said outlet, wherein at least one air conveyance channel is defined in said enclosure and extends from said inlet to said outlet, along said conveyance channel there being at least one condensation chamber for condensing the water contained in the flow of air that passes through said conveyance channel, said cooling means comprising means configured for circulating a cooling fluid, in a heat exchange relationship with said condensation chamber, at least one discharge port for the water condensed and separated from the flow of air passing through said conveyance channel being defined in said enclosure.

2. The apparatus according to claim 1, wherein said variation means comprise temperature varying means configured for varying a temperature of the flow of air extracted from said vacuum chamber.

3. The apparatus according to claim 1, wherein said variation means comprise momentum varying means configured for varying a momentum of a quantity of motion of said flow of air extracted from said vacuum chamber.

4. The apparatus according to claim 1, wherein said variation means comprise pressure/speed varying means configured for varying a pressure/speed of the flow of air extracted from said vacuum chamber.

5. The apparatus according to claim 1, wherein said variation means comprise density varying means configured for varying a density, at a constant volume, of the air extracted from said vacuum chamber.

6. The apparatus according to claim 2, wherein said means for varying the temperature comprise cooling means.

7. The apparatus according to claim 1, wherein said enclosure has an axial extension, said inlet being defined axially at one end of said enclosure, said condensation chamber extending along the axis of said enclosure.

8. The apparatus according to claim 1, wherein said outlet is defined radially at another end of said enclosure and communicates with at least one connecting portion of said conveyance channel which is connected to said condensation chamber and extends circumferentially around the axis of said enclosure.

9. The apparatus according to claim 1, wherein at least one portion which increases a speed of the flow of air that passes through said conveyance channel is defined along said conveyance duct, between said condensation chamber and said outlet.

10. The apparatus according to claim 1, further comprising heating means in a heat exchange relationship with said conveyance channel.

* * * * *